US012803597B2

(12) United States Patent
Wang et al.

(10) Patent No.: US 12,803,597 B2
(45) Date of Patent: Nov. 17, 2026

(54) ELECTRONIC DEVICE

(71) Applicant: VIVO MOBILE COMMUNICATION CO., LTD., Guangdong (CN)

(72) Inventors: Shen Wang, Guangdong (CN); Yuwen Liang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 352 days.

(21) Appl. No.: 18/422,396

(22) Filed: Jan. 25, 2024

(65) Prior Publication Data

US 2024/0171200 A1 May 23, 2024

Related U.S. Application Data

(63) Continuation of application No. PCT/CN2022/107302, filed on Jul. 22, 2022.

(30) Foreign Application Priority Data

Jul. 27, 2021 (CN) ......................... 202110849273.3

(51) Int. Cl.

| | |
|---|---|
| *H04B 1/00* | (2006.01) |
| *H01Q 1/24* | (2006.01) |
| *H01Q 3/26* | (2006.01) |
| *H04B 1/3827* | (2015.01) |

(52) U.S. Cl.

CPC ........... *H04B 1/0064* (2013.01); *H01Q 1/243* (2013.01); *H01Q 3/26* (2013.01); *H04B 1/3838* (2013.01)

(58) Field of Classification Search

CPC .... H04B 1/0064; H04B 1/3838; H04B 1/005; H01Q 1/243; H01Q 3/26; H01Q 1/38; H01Q 1/245; H01Q 5/335; H01Q 5/371; H01Q 5/40; H01Q 21/28; H01Q 1/50;

(Continued)

(56) References Cited

U.S. PATENT DOCUMENTS

2006/0139216 A1* 6/2006 Glocker ............... H04B 1/3838
2007/0146212 A1* 6/2007 Ozden ....................... H01Q 1/38
343/702

(Continued)

FOREIGN PATENT DOCUMENTS

CN 104916916 A * 9/2015 ............... H01Q 1/50
CN 108879116 A 11/2018

(Continued)

*Primary Examiner* — Lana N Le
(74) *Attorney, Agent, or Firm* — Price Heneveld LLP

(57) ABSTRACT

This application discloses an electronic device including a first feed source, a second feed source, a first matching circuit, a second matching circuit, a first radiator, and a second radiator. The first feed source is electrically connected to the first radiator through the first matching circuit, the second feed source is electrically connected to the second radiator through the second matching circuit, and the first radiator is coupled to the second radiator. Under the action of a first excitation signal input by the first feed source, the first radiator operates in a first band and the second radiator operates in a second band; and under the action of a second excitation signal input by the second feed source, the second radiator operates in a third band and the first radiator operates in a fourth band.

18 Claims, 5 Drawing Sheets

(58) Field of Classification Search
CPC ............ H01Q 1/241; H01Q 1/36; H01Q 5/10; H01Q 5/28; H01Q 5/50; H01Q 21/00
See application file for complete search history.

(56) References Cited

U.S. PATENT DOCUMENTS

| | | | | |
|---|---|---|---|---|
| 2010/0109955 | A1* | 5/2010 | Anguera | H01Q 1/243 343/702 |
| 2011/0241950 | A1* | 10/2011 | Milosavljevic | H01Q 5/40 |
| 2013/0162497 | A1 | 6/2013 | Satou et al. | |
| 2015/0044977 | A1* | 2/2015 | Ramasamy | H04B 1/005 455/77 |
| 2018/0026348 | A1 | 1/2018 | Lee et al. | |
| 2018/0026349 | A1 | 1/2018 | Lee et al. | |
| 2021/0159611 | A1* | 5/2021 | Wu | H01Q 21/30 |
| 2022/0247079 | A1* | 8/2022 | Wang | H01Q 5/385 |
| 2023/0387594 | A1* | 11/2023 | Wu | H01Q 5/335 |
| 2023/0420846 | A1 | 12/2023 | Wu | |
| 2024/0380095 | A1* | 11/2024 | Wang | H01Q 5/335 |

FOREIGN PATENT DOCUMENTS

| | | | | | |
|---|---|---|---|---|---|
| CN | 208433511 | U | * | 1/2019 | H04B 1/005 |
| CN | 109687110 | A | | 4/2019 | |
| CN | 111509368 | A | | 8/2020 | |
| CN | 211350963 | U | | 8/2020 | |
| CN | 112072286 | A | | 12/2020 | |
| CN | 212277399 | U | | 1/2021 | |
| CN | 112751204 | A | | 5/2021 | |
| CN | 112768900 | A | | 5/2021 | |
| CN | 112838370 | A | | 5/2021 | |
| CN | 113571898 | A | | 10/2021 | |
| JP | 2013247503 | A | | 12/2013 | |
| WO | 2018028101 | A1 | | 2/2018 | |
| WO | WO-2023226758 | A1 | * | 11/2023 | H01Q 1/36 |

* cited by examiner

ELECTRONIC DEVICE

CROSS-REFERENCE TO RELATED APPLICATIONS

This application is a Bypass continuation application of PCT International Application No. PCT/CN2022/107302 filed on Jul. 22, 2022, which claims priority to Chinese Patent Application No. 202110849273.3, filed in China on Jul. 27, 2021, which are incorporated in their entireties by reference herein.

TECHNICAL FIELD

This application pertains to the field of communication technologies, and specifically, relates to an electronic device.

BACKGROUND

Currently, electronic devices are usually equipped with antennas. In the process of implementing this application, the applicant has found that there are at least the following problems in the prior art: In practical applications, due to the increasing functionality of electronic devices, it is necessary to have a large number of radiators installed in electronic devices. At the same time, in order to ensure good radiation performance for each radiator, it is necessary to ensure that the size of the radiator is large. Therefore, it can be seen that there is a large number of radiators in a current electronic device, and the size of the radiator is large, resulting in a larger size of the electronic device.

SUMMARY

This application aims to provide an electronic device.

An embodiment of this application provides an electronic device including a first feed source, a second feed source, a first matching circuit, a second matching circuit, a first radiator, and a second radiator, where the first feed source is electrically connected to the first radiator through the first matching circuit, the second feed source is electrically connected to the second radiator through the second matching circuit, and the first radiator is coupled to the second radiator.

Under the action of a first excitation signal input by the first feed source, the first radiator operates in a first band and the second radiator operates in a second band; and under the action of a second excitation signal input by the second feed source, the second radiator operates in a third band and the first radiator operates in a fourth band; where the first band, the second band, the third band, and the fourth band are different.

For additional aspects and advantages of this application, some will be given in the following description, and some will become apparent in the following description or will be understood in the practice of this application.

BRIEF DESCRIPTION OF DRAWINGS

The above and/or additional aspects and advantages of this application will become obviously easy to understand from the description of the embodiments with reference to the following drawings.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects rather than to describe a specific order or sequence. It should be understood that the data used in such a way is interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "/" generally indicates that the associated objects have an "or" relationship.

Figure 1:
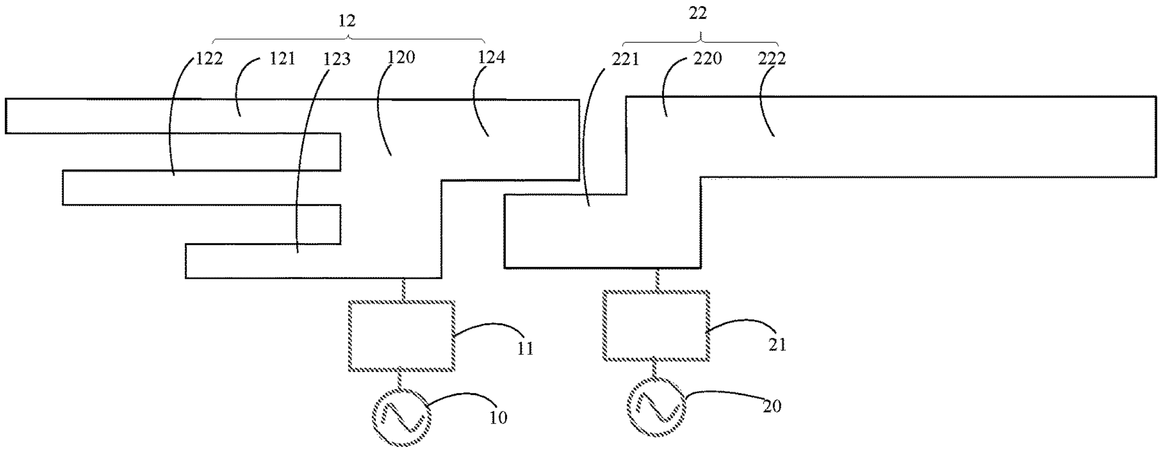
FIG. 1 is a first schematic structural diagram of an electronic device according to an embodiment of this application.

Referring to FIG. 1, FIG. 1 is a schematic structural diagram of an electronic device according to an embodiment of this application. As shown in FIG. 1, the electronic device includes a first feed source 10, a second feed source 20, a first matching circuit 11, a second matching circuit 21, a first radiator 12, and a second radiator 22, where the first feed source 10 is electrically connected to the first radiator 12 through the first matching circuit 11, the second feed source 20 is electrically connected to the second radiator 22 through the second matching circuit 21, and the first radiator 12 is coupled to the second radiator 22.

Under the action of a first excitation signal input by the first feed source 10, the first radiator 12 operates in a first band and the second radiator 22 operates in a second band; and under the action of a second excitation signal input by the second feed source 20, the second radiator 22 operates in a third band and the first radiator 12 operates in a fourth band; where the first band, the second band, the third band, and the fourth band are different.

The operation principles of this embodiment of this application can be found in the following expressions.

The first excitation signal input by the first feed source 10 can cause the first radiator 12 to operate in the first band and cause the second radiator 22 to operate in the second band, the second excitation signal input by the second feed source 20 can cause the second radiator 22 to operate in the third band and cause the first radiator 12 to operate in the fourth band, and the first band, the second band, the third band, and the fourth band are different. In this way, bands in which the antenna of the electronic device operates are increased, increasing the bandwidth of the antenna of the electronic device, thereby enhancing the radiation performance of the electronic device.

It should be noted that, in an optional embodiment, the first matching circuit 11 and the second matching circuit 21 each include a filter circuit. As the filter circuit is provided in both the first matching circuit 11 and the second matching circuit 21, a band 5 can excited through coupling in the second radiator 22 (for details, reference may be made to the corresponding descriptions of FIG. 5 and FIG. 6 below), which is beneficial to increase the bandwidth of the electronic device and also facilitates the layout of the radiators on the electronic device.

In addition, compared with a method of arranging multiple radiators, with each radiator operating in a specific band, this embodiment reduces the number of radiators, reducing the installation space occupied by the radiators in the electronic device, thereby reducing the size of the electronic device.

It should be noted that because both the first band and the second band are excited by the first excitation signal, the first band and the second band may have a correspondence with the first excitation signal, and when a parameter of the first excitation signal is changed, the first band and the second band may also be changed correspondingly; and similarly, because both the third band and the fourth band are excited by the second excitation signal, the third band and the fourth band may have a correspondence with the second excitation signal, and when a parameter of the second excitation signal is changed, the third band and the fourth band may also be changed correspondingly. The parameters of the first excitation signal and the second excitation signal may refer to at least one of parameters such as frequency and radiation intensity.

The first excitation signal may be coupled to the second radiator 22 through the first radiator 12, so both the first radiator 12 and the second feed source 20 can be understood as feed sources of the second radiator 22 in this case; and the second excitation signal may be coupled to the first radiator 12 through the second radiator 22, so both the second radiator 22 and the first feed source 10 can be understood as feed sources of the first radiator 12 in this case. Therefore, the first radiator 12 and the second radiator 22 may be referred to as a mutually coupled structure.

It should be noted that, to enhance the coupling between the first radiator 12 and the second radiator 22, a distance between the first radiator 12 and the second radiator 22 can be shortened. In an optional embodiment, the distance between the first radiator 12 and the second radiator 22 is in the range of 0.5 mm-2 mm. This allows for a short distance between the first radiator 12 and the second radiator 22 and allows for better coupling between the first radiator 12 and the second radiator 22.

The first radiator 12 and the second radiator 22 may be components of a metal frame, that is, the first radiator 12 and the second radiator 22 are parts of a metal frame of the electronic device. In addition, the first radiator 12 and the second radiator 22 may also use a liquid crystal polymer (LCP) antenna, a modified polyimide (MPI) antenna, a laser direct structuring (LDS) antenna, a leaky mode antenna (LMA), a print direct structuring (PDS) antenna, a flexible printed circuit (FPC) board, a printed circuit board (PCB), and other conductor alignment forms. In addition, the type of the first radiator 12 and the second radiator 22 may be in the form of a printed inverted-F antenna (PIFA), an inverted-F antenna (IFA), a monopole antenna, a loop antenna, and the like.

It should be noted that due to the high dielectric constant of the human skin and muscle tissue, when the human body approaches the electronic device, the human hand and head come close to the radiators of the electronic device. This proximity causes a deviation in the resonant frequency of the radiators and absorption of electromagnetic waves by the human body. This significantly affects the radiation efficiency within the operating range of the radiators, thereby reducing the performance of wireless communication of mobile terminals, and also increasing the absorption of electromagnetic waves by the human body, which can be measured by a value of specific absorption ratio (SAR).

Therefore, in an optional embodiment, the first radiator 12 includes M sub-radiators, where the M sub-radiators may be spaced apart from each other; and the second radiator 22 includes N sub-radiators, where the N sub-radiators may be spaced apart from each other, and M and N are positive integers.

In this way, when M and N are greater than or equal to 2, since the first radiator 12 and the second radiator 22 each include at least two sub-radiators, sizes of the first radiator 12 and the second radiator 22 are increased without increasing the number of the radiators, such that the distribution of energy on the first radiator 12 and the second radiator 22 can be dispersed. This effectively reduces the SAR value when the human body approaches the electronic device, thereby reducing the harm to the human body and also reducing the impact on the radiation performance of the electronic device.

Figure 7:
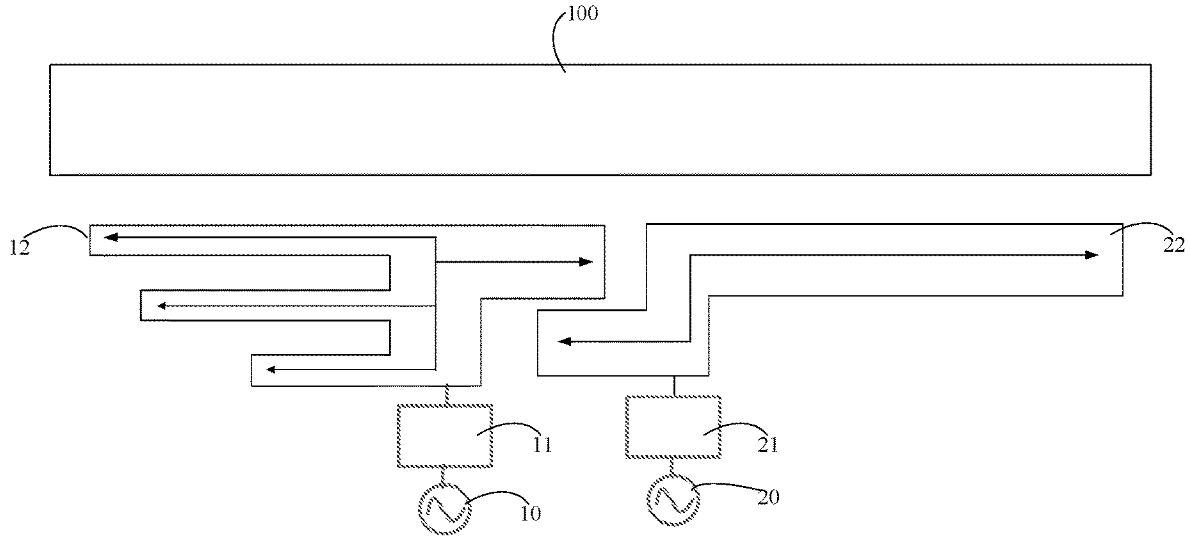
FIG. 7 is a first current distribution diagram of an electronic device according to an embodiment of this application.

Referring to FIG. 7, FIG. 7 is a current distribution diagram of the first radiator 12 and the second radiator 22 when a human body 100 is close to the electronic device, where the white arrows in FIG. 7 represent flowing directions of the current. It can be seen that when the first radiator 12 and the second radiator 22 each includes at least two sub-radiators, the currents on the first radiator 12 and the second radiator 22 are more dispersed, reducing the SAR of the human body.

Figure 2:
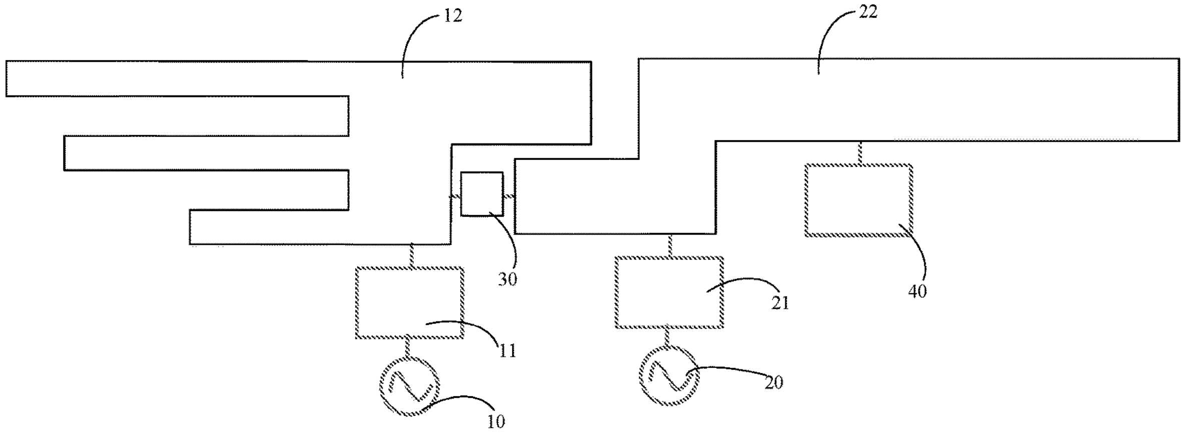
FIG. 2 is a second schematic structural diagram of an electronic device according to an embodiment of this application.

In an optional embodiment, referring to FIG. 2, the electronic device further includes a first controller 30 and an SAR sensor 40 for detecting a human body. The first radiator 12 and the second radiator 22 are connected to each other through the first controller 30, and the second radiator 22 is connected to the SAR sensor 40.

In a case that the SAR sensor 40 has detected that a distance between a human body and the electronic device is a first distance, the first controller 30 is adjusted such that a current flowing from the first radiator 12 through the first controller 30 into the second radiator 22 is a first value; and in a case that the SAR sensor 40 has detected that the distance between the human body and the electronic device is a second distance, the first controller 30 is adjusted such that the current flowing from the first radiator 12 through the first controller 30 into the second radiator 22 is a second value, where the first distance is greater than the second distance, and the first value is less than the second value.

It should be noted that when the human body does not approach the electronic device, that is, when the human body is far away from the electronic device, the resonance frequency is a preset value, and when the human body approaches the electronic device, the resonance frequency increases from the preset value to the first value.

In this embodiment, when the SAR sensor 40 has detected that the human body approaches the electronic device, the first controller 30 is adjusted to increase the value of the current flowing from the first radiator 12 through the first controller 30 into the second radiator 22, to be specific, to enable more connectivity between the first radiator 12 and the second radiator 22, so as to reduce the resonance frequency from the first value to the preset value. This ensures good radiation performance of the electronic device, reduces the impact of the human body on the radiation performance of the electronic device when the human body approaches the electronic device, and can disperse the electromagnetic energy on the first radiator 12 and the second radiator 22 so as to reduce the value of the SAR, that is, to reduce the ratio of radiation absorption of the human body to the radiation of the radiator of the electronic device.

It should be noted that a conducting loop in the first controller 30 can be adjusted so as to adjust the value of the current flowing from the first radiator 12 through the first controller 30 into the second radiator 22. For example, there is a plurality of conducting loops in the first controller 30, a value of current passing through each conducting loop is a fixed value, and values of currents passing through any two of the conducting loops are different, such that the value of the current passing through the first controller 30 can be controlled by controlling the conduction of one of the conducting loops.

It should be noted that the specific manner in which the first controller 30 controls the current is not limited herein, and the manner of control is related to the type of the first controller 30.

The current distribution and impedance state between the first radiator 12 and the second radiator 22 can be adjusted by adjusting the state of the first controller 30.

Figure 8:
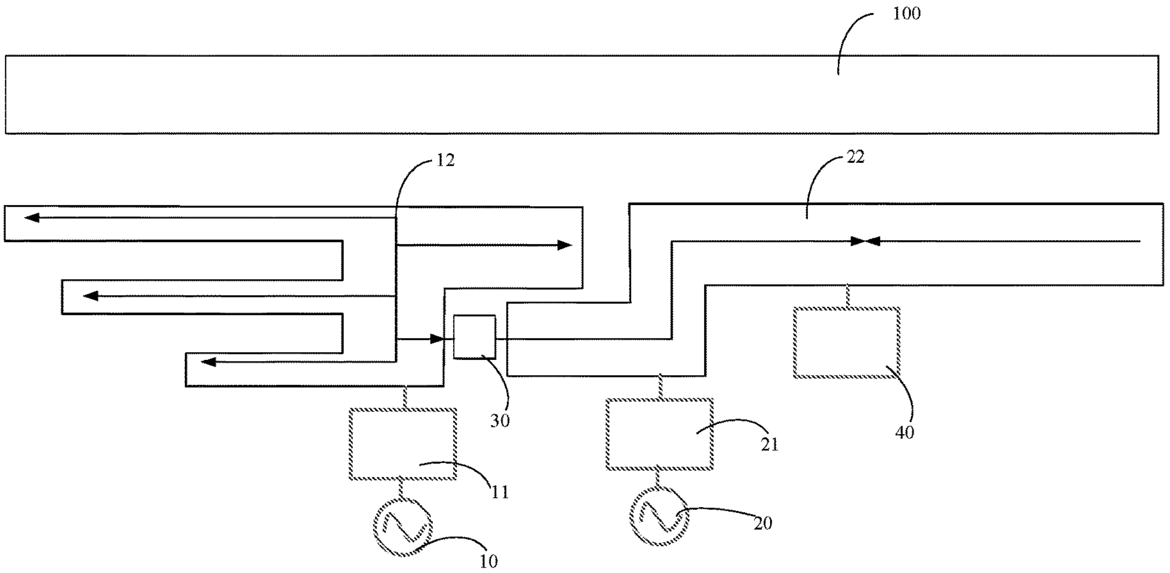
FIG. 8 is a second current distribution diagram of an electronic device according to an embodiment of this application.

Referring to FIG. 8, FIG. 8 is a current distribution diagram of the first radiator 12 and the second radiator 22 when a human body 100 is close to the electronic device, where the white arrows in FIG. 8 represent flowing directions of the current. It can be seen that when the first radiator 12 and the second radiator 22 each include at least two sub-radiators and the first radiator 12 and the second radiator 22 are connected to each other through the first controller 30, the currents on the first radiator 12 and the second radiator 22 are likewise more dispersed, and the SAR of the human body is likewise reduced.

Figure 3:
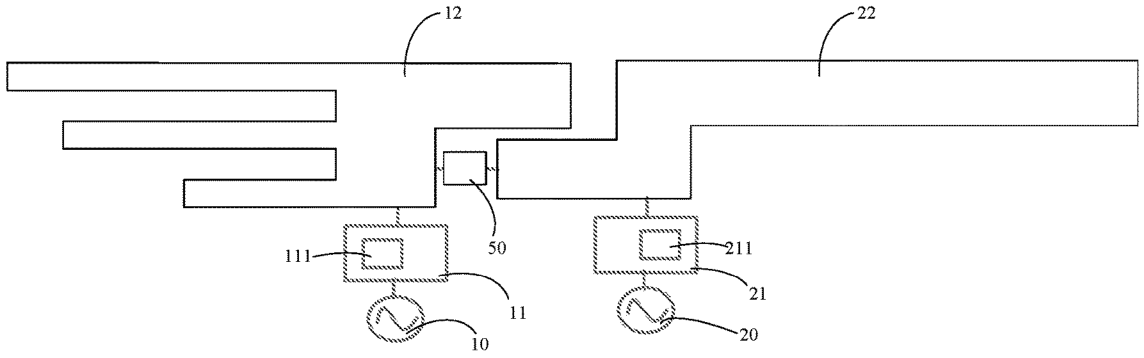
FIG. 3 is a third schematic structural diagram of an electronic device according to an embodiment of this application.

In an optional embodiment, referring to FIG. 3, the electronic device further includes a second controller 50, where the first radiator 12 and the second radiator 22 are connected through the second controller 50; and the first matching circuit 11 includes a first antenna tuner 111, and/or the second matching circuit 21 includes a second antenna tuner 211; where in a case that a distance between a human body and the electronic device is a third distance, the second controller 50 is adjusted such that a current flowing from the first radiator 12 through the second controller 50 into the second radiator 22 is a third value, the first antenna tuner adjusts an input impedance of the first radiator 12 to a first impedance, and the second antenna tuner adjusts an input impedance of the second radiator 22 to a second impedance;

in a case that the distance between the human body and the electronic device is a fourth distance, the input impedance of the first radiator 12 is a third impedance, the input impedance of the second radiator 22 is a fourth impedance, the second controller 50 is adjusted such that a current flowing from the first radiator 12 through the second controller 50 into the second radiator 22 is a fourth value, the first antenna tuner adjusts the input impedance of the first radiator 12 from the third impedance to the first impedance, and the second antenna tuner adjusts the input impedance of the second radiator 22 from the fourth impedance to the second impedance; and the third impedance is different from the first impedance, the fourth impedance is different from the second impedance, the third distance is greater than the fourth distance, and the third value is less than the fourth value.

It should be noted that for the control principle of the second controller 50, reference may be made to relevant descriptions of the control principle of the first controller 30 described above, and the details are not repeated herein.

In this embodiment, the distance between the human body and the electronic device can be detected by the first antenna tuner 111 and/or the second antenna tuner 211, and when the human body has been detected to approach the electronic device, the second controller 50 can be adjusted to increase the value of the current flowing from the first radiator 12 through the second controller 50 into the second radiator 22, to be specific, to enable more connectivity between the first radiator 12 and the second radiator 22, so as to reduce the resonance frequency from the first value to the preset value. This ensures good radiation performance of the electronic device, and can disperse the electromagnetic energy on the first radiator 12 and the second radiator 22 so as to reduce the value of the SAR.

In addition, the impedance of the first matching circuit 11 and/or the second matching circuit 21 can also be adjusted by adjusting the first antenna tuner 111 and/or the second antenna tuner 211, so as to cause the input impedance of the first radiator 12 to be adjusted from the third impedance to the first impedance and cause the input impedance of the second radiator 22 to be adjusted from the fourth impedance to the second impedance, such that the first radiator 12 is always maintained at the first impedance and the input impedance of the second radiator 22 is always maintained at the second impedance, enhancing the radiation performance of the first radiator 12 and the second radiator 22.

The first antenna tuner 111 may be referred to as a first closed-loop tuner, and the second antenna tuner 211 may be referred to as a second closed-loop tuner.

Figure 9:
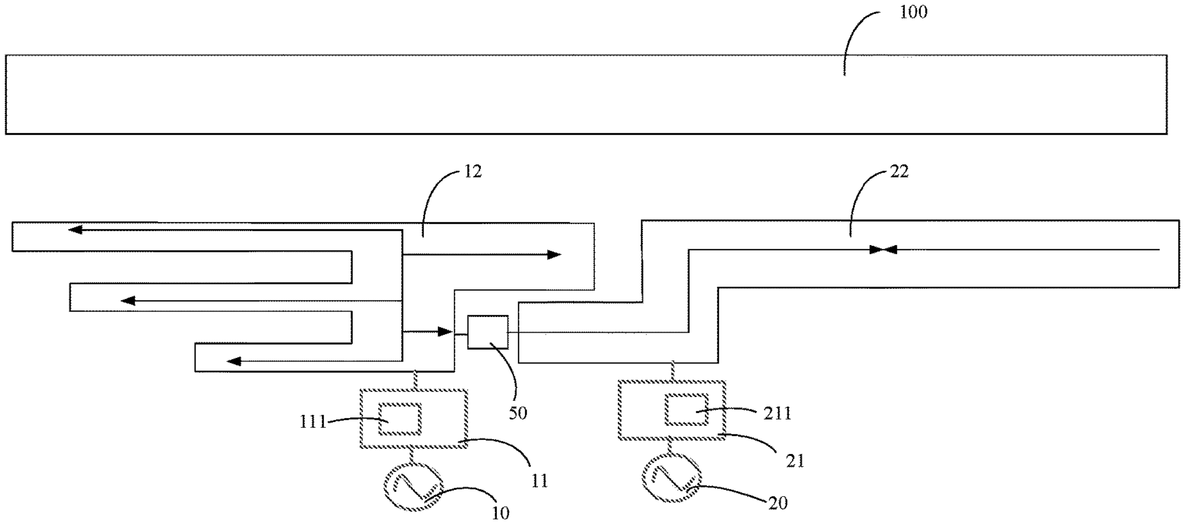
FIG. 9 is a third current distribution diagram of an electronic device according to an embodiment of this application.

Referring to FIG. 9, FIG. 9 is a current distribution diagram of the first radiator 12 and the second radiator 22 when a human body 100 is close to the electronic device, where the white arrows in FIG. 9 represent flowing directions of the current. It can be seen that when the first radiator 12 and the second radiator 22 each include at least two sub-radiators and the first radiator 12 and the second radiator 22 are connected to each other through the second controller 50, the currents on the first radiator 12 and the second radiator 22 are likewise more dispersed, and the SAR of the human body is likewise reduced.

It should be noted that the numbers of sub-radiators included in the first radiator 12 and the second radiator 22 are not limited herein.

In an optional embodiment, referring to FIG. 1, the first radiator 12 includes a first body 120, a first sub-radiator 121, a second sub-radiator 122, a third sub-radiator 123, and a fourth sub-radiator 124, where the first sub-radiator 121, the second sub-radiator 122, and the third sub-radiator 123 are all located on a first side of the first body 120, the first sub-radiator 121, the second sub-radiator 122, and the third sub-radiator 123 are spaced apart from each other, and the fourth sub-radiator 124 is located on a second side of the first body 120; and referring to FIG. 1, the second radiator 22 further includes a second body 220, a fifth sub-radiator 221, and a sixth sub-radiator 222, where the fifth sub-radiator 221 is located on a first side of the second body 220, the sixth sub-radiator 222 is located on a second side of the second body 220, the fifth sub-radiator 221 is arranged facing a second side of the first body 120, the fifth sub-radiator 221 is arranged at least partially opposite the fourth sub-radiator 124, and the fifth sub-radiator 221 is apart from the fourth sub-radiator 124.

The first radiator 12 includes the first sub-radiator 121, the second sub-radiator 122, the third sub-radiator 123, and the fourth sub-radiator 124, and the sub-radiator may be referred to as an antenna branch or a branched antenna. Therefore, the first radiator 12 may be referred to as a four-branched antenna. Similarly, the second radiator 22 includes the fifth sub-radiator 221 and the sixth sub-radiator 222, and therefore the second radiator 22 may be referred to as a two-branched antenna.

The first body 120, the first sub-radiator 121, the second sub-radiator 122, the third sub-radiator 123, and the fourth sub-radiator 124 are made of the same material, and the first body 120, the first sub-radiator 121, the second sub-radiator 122, the third sub-radiator 123, and the fourth sub-radiator 124 may be formed as an integral structure, which strengthens the overall strength of the first radiator 12. Similarly, the second body 220, the fifth sub-radiator 221, and the sixth sub-radiator 222 may likewise be made of the same material, and the second body 220, the fifth sub-radiator 221, and the sixth sub-radiator 222 may also be formed as an integral structure.

Figure 4:
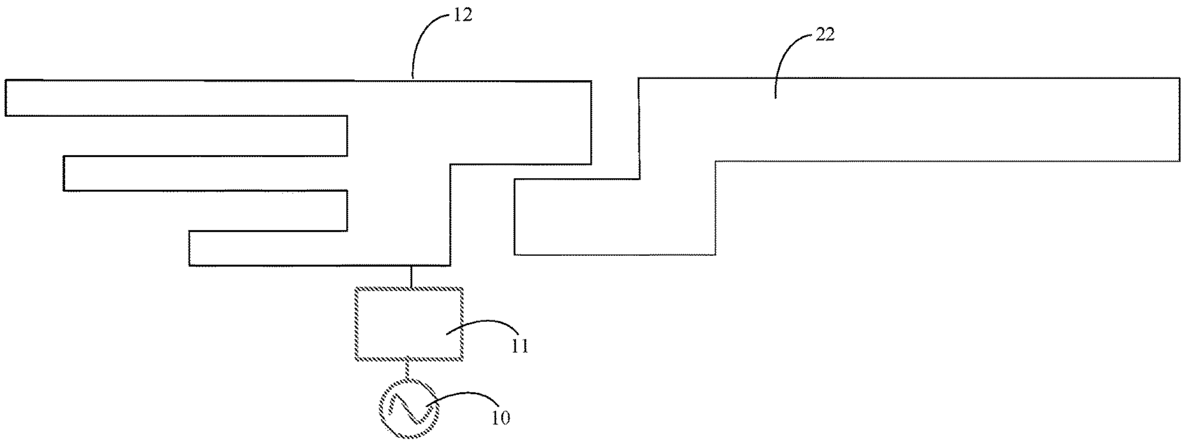
FIG. 4 is a fourth schematic structural diagram of an electronic device according to an embodiment of this application.

In this embodiment of this application, the first radiator 12 includes the first sub-radiator 121, the second sub-radiator 122, the third sub-radiator 123, and the fourth sub-radiator 124, and the first radiator 12 can be coupled to the second radiator 22, in which case the radiator assembly composed of the first radiator 12 and the second radiator 22 can be seen in FIG. 4. Therefore, under the action of the first excitation signal input by the first feed source 10, the sub-radiators included in the first radiator 12 and the second radiator 22 can excite five bands, causing an increase in the number of bands and a corresponding increase in the operating bandwidth within some of the operating bands, thereby causing an increase in the total bandwidth of the electronic device, and further enhancing the radiation performance of the electronic device.

It should be noted that the fifth sub-radiator 221 is at least partially arranged opposite the fourth sub-radiator 124, such that a distance between the fifth sub-radiator 221 and the fourth sub-radiator 124 is relatively short and the relative area between the fifth sub-radiator 221 and the fourth sub-radiator 124 is relatively large, thereby enhancing the coupling between the first radiator 12 and the second radiator 22.

Figure 5:
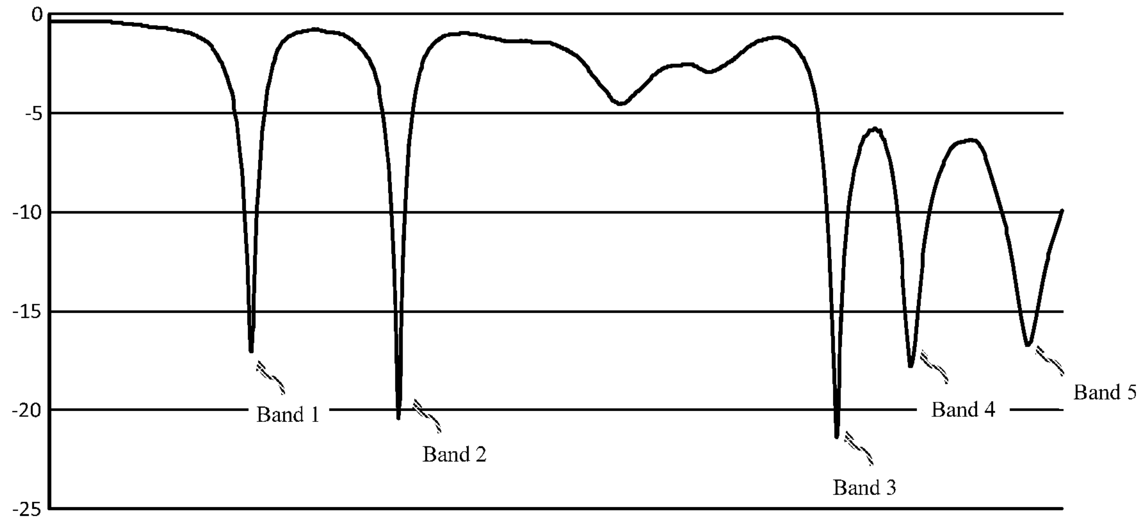
FIG. 5 is a first S11 comparative diagram of an electronic device according to an embodiment of this application.

It should be noted that the foregoing five bands may mean that the four sub-radiators included in the first radiator 12 each excite one band and under the action of the first excitation signal, the second radiator 22 excites another band, and the five bands may be called in turn as band 1 (corresponding to the first sub-radiator 121), band 2 (corresponding to the second sub-radiator 122), band 3 (corresponding to the third sub-radiator 123), band 4 (corresponding to the fourth sub-radiator 124), and band 5 (corresponding to the second radiator 22). For details, refer to FIG. 5. FIG. 5 is an S11 comparison diagram of the first radiator 12 and the second radiator 22, where the S11 comparison diagram may also be called a return loss comparison diagram or an S-parameter comparison diagram.

Figure 6:
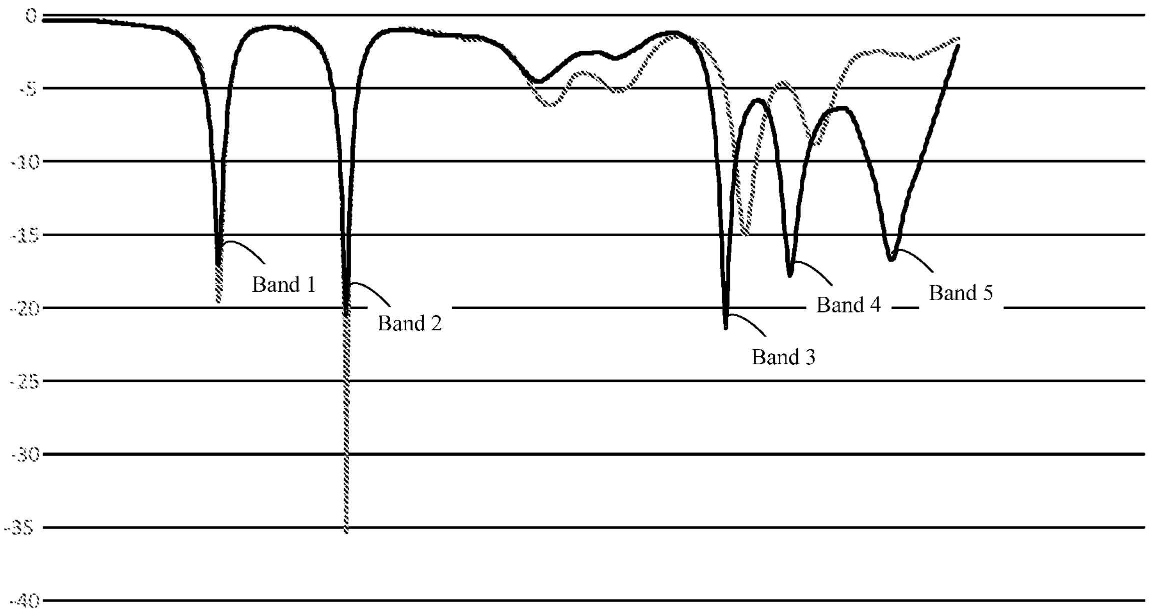
FIG. 6 is a second S11 comparative diagram of an electronic device according to an embodiment of this application.

In addition, referring to FIG. 6, the dashed line in FIG. 6 is an S11 comparison diagram of radiators of an electronic device in the prior art, and the solid line in FIG. 6 is an S11 comparison diagram of the first radiator 12 and the second radiator 22 in this embodiment. It can be clearly seen that compared with the prior art, the first radiator 12 and the second radiator 22 in this embodiment have more operating bands, and the bandwidth of some bands is wider, resulting in a wider total bandwidth. Combining FIG. 5 and FIG. 6, it can be seen that the bandwidth can be effectively increased by 50%-80% at the positions of band 3, band 4, and band 5 (in these cases, the effective bandwidth S11 is greater than or equal to 7.3 dB, in other words, the voltage standing wave ratio (VSWR) is less than or equal to 2.5), thereby realizing an ultra-wideband design of the antenna.

It should be noted that for the operating principle of the two sub-radiators, namely, the fifth sub-radiator 221 and the sixth sub-radiator 222, included in the second radiator 22, reference may be made to the corresponding descriptions of the four radiators, namely, the first sub-radiator 121, the second sub-radiator 122, the third sub-radiator 123, and the fourth sub-radiator 124, included in the first radiator 12 as described above, and the details are not repeated herein. Because the second radiator 22 and the first radiator 12 can be coupled, the second radiator 22 further includes two sub-radiators, namely, the fifth sub-radiator 221 and the sixth sub-radiator 222, the number of bands can likewise to be increased so as to further enhance the radiation performance of the electronic device.

It should be noted that the fifth sub-radiator 221 and the sixth sub-radiator 222 are located on the first side and the second side of the second body 220, respectively, but positions of connections of the fifth sub-radiator 221 and the sixth sub-radiator 222 to the second body 220 are not limited herein. In an optional embodiment, the second body 220 includes a first end portion and a second end portion, where the fifth sub-radiator 221 and the sixth sub-radiator 222 are both connected to the first end portion, or the fifth sub-radiator 221 and the sixth sub-radiator 222 are both connected to the second end portion.

In an optional embodiment, the second body 220 includes a first end portion and a second end portion, where the fifth sub-radiator 221 is connected to the first end portion, and the sixth sub-radiator 222 is connected to the second end portion. In this way, compared with the foregoing embodiment, the distance over which the current flows on the second body 220 grows (the distance over which the current flows on the second body 220 in this embodiment is a distance between the first end portion and the second end portion), lengthening the flow path of the current on the second radiator 22, further enhancing the dispersion of the current on the second radiator 22, thereby further reducing the SAR of the human body and reducing the damage caused to the human health.

In an optional embodiment, lengths of the first sub-radiator 121, the second sub-radiator 122, the third sub-radiator 123, the fourth sub-radiator 124, the fifth sub-radiator 221, and the sixth sub-radiator 222 are all different.

In this way, because the length of the sub-radiator is related to the band excited by the sub-radiator, usually it is a quarter wavelength of the band of the sub-radiator, the lengths of the first sub-radiator 121, the second sub-radiator 122, the third sub-radiator 123, the fourth sub-radiator 124, the fifth sub-radiator 221, and the sixth sub-radiator 222 are controlled to be different, such that the total operating bandwidth of the electronic device can be increased by increasing the number of bands excited by the sub-radiator, thereby further enhancing the radiation performance of the electronic device.

In an optional embodiment, the first sub-radiator 121, the second sub-radiator 122, and the third sub-radiator 123 are arranged sequentially and the lengths of the first sub-radiator 121, the second sub-radiator 122, and the third sub-radiator 123 are in ascending or descending order.

In this way, the bands excited by the first sub-radiator 121, the second sub-radiator 122 and the third sub-radiator 123 can also be distributed sequentially, and the first sub-radiator 121, the second sub-radiator 122 and the third sub-radiator 123 are easily assembled.

In an optional embodiment, the length of the fifth sub-radiator 221 is less than the length of the sixth sub-radiator 222, and the fifth sub-radiator 221 is at least partially arranged opposite the fourth sub-radiator 124. In this way, this embodiment can shorten the gap between the first radiator 12 and the second radiator 22 as compared to the manner in which the length of the fifth sub-radiator 221 is greater than the length of the sixth sub-radiator 222, thereby enhancing the coupling between the first radiator 12 and the second radiator 22.

In the description of this specification, descriptions referring to the terms "an embodiment", "some embodiments", "exemplary embodiments", "an example", "a specific example", or "some examples" mean the specific features, structures, materials or characteristics described with to the embodiment or example are included in at least one embodiment or example of this application. In this specification, illustrative expressions of these terms do not necessarily refer to the same embodiment or example. Moreover, the specific feature, structure, material, or characteristic described may be combined in any suitable manner in any one or more embodiments or examples.

Although the embodiments of this application have been shown and described, those of ordinary skill in the art can understand that various changes, modifications, substitutions, and variants of these embodiments may be made without departing from the principles and purposes of this application, and the scope of this application is limited by the claims and their equivalents.

What is claimed is:

1. An electronic device, comprising a first feed source, a second feed source, a first matching circuit, a second matching circuit, a first radiator, and a second radiator, wherein the first feed source is electrically connected to the first radiator through the first matching circuit, the second feed source is electrically connected to the second radiator through the second matching circuit, and the first radiator is coupled to the second radiator; and under the action of a first excitation signal input by the first feed source, the first radiator operates in a first band and the second radiator operates in a second band; and under the action of a second excitation signal input by the second feed source, the second radiator operates in a third band and the first radiator operates in a fourth band; wherein the first band, the second band, the third band, and the fourth band are different; and the first radiator comprises a first body, a first sub-radiator, a second sub-radiator, a third sub-radiator, and a fourth sub-radiator, wherein the first sub-radiator, the second sub-radiator, and the third sub-radiator are all located on a first side of the first body, the first sub-radiator, the second sub-radiator, and the third sub-radiator are spaced apart from each other, and the fourth sub-radiator is located on a second side of the first body; and the second radiator comprises a second body, a fifth sub-radiator, and a sixth sub-radiator, wherein the fifth sub-radiator is located on a first side of the second body, the sixth sub-radiator is located on a second side of the second body, the fifth sub-radiator is arranged facing the second side of the first body, the fifth sub-radiator is arranged at least partially opposite the fourth sub-radiator, and the fifth sub-radiator is apart from the fourth sub-radiator.

2. The electronic device according to claim 1, wherein the second body comprises a first end portion and a second end portion, wherein the fifth sub-radiator is connected to the first end portion, and the sixth sub-radiator is connected to the second end portion.

3. The electronic device according to claim 2, wherein the electronic device further comprises a first controller and a specific absorption ratio (SAR) sensor for detecting a human body, wherein the first radiator and the second radiator are connected to each other through the first controller, and the second radiator is connected to the SAR sensor; and in a case that the SAR sensor has detected that a distance between a human body and the electronic device is a first distance, the first controller is adjusted such that a current flowing from the first radiator through the first controller into the second radiator is a first value; and in a case that the SAR sensor has detected that the distance between the human body and the electronic device is a second distance, the first controller is adjusted such that the current flowing from the first radiator through the first controller into the second radiator is a second value, wherein the first distance is greater than the second distance, and the first value is less than the second value.

4. The electronic device according to claim 2, wherein the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

5. The electronic device according to claim 1, wherein lengths of the first sub-radiator, the second sub-radiator, the third sub-radiator, the fourth sub-radiator, the fifth sub-radiator, and the sixth sub-radiator are all different.

6. The electronic device according to claim 5, wherein the first sub-radiator, the second sub-radiator, and the third sub-radiator are arranged sequentially and the lengths of the first sub-radiator, the second sub-radiator, and the third sub-radiator are in ascending or descending order.

7. The electronic device according to claim 6, wherein the electronic device further comprises a first controller and a specific absorption ratio (SAR) sensor for detecting a human body, wherein the first radiator and the second radiator are connected to each other through the first controller, and the second radiator is connected to the SAR sensor; and in a case that the SAR sensor has detected that a distance between a human body and the electronic device is a first distance, the first controller is adjusted such that a current flowing from the first radiator through the first controller into the second radiator is a first value; and in a case that the SAR sensor has detected that the distance between the human body and the electronic device is a second distance, the first controller is adjusted such that the current flowing from the first radiator through the first controller into the second radiator is a second value, wherein the first distance is greater than the second distance, and the first value is less than the second value.

8. The electronic device according to claim 6, wherein the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

9. The electronic device according to claim 5, wherein the length of the fifth sub-radiator is less than the length of the sixth sub-radiator.

10. The electronic device according to claim 9, wherein the electronic device further comprises a first controller and a specific absorption ratio (SAR) sensor for detecting a human body, wherein the first radiator and the second radiator are connected to each other through the first controller, and the second radiator is connected to the SAR sensor; and in a case that the SAR sensor has detected that a distance between a human body and the electronic device is a first distance, the first controller is adjusted such that a current flowing from the first radiator through the first controller into the second radiator is a first value; and in a case that the SAR sensor has detected that the distance between the human body and the electronic device is a second distance, the first controller is adjusted such that the current flowing from the first radiator through the first controller into the second radiator is a second value, wherein the first distance is greater than the second distance, and the first value is less than the second value.

11. The electronic device according to claim 9, wherein the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

12. The electronic device according to claim 5, wherein the electronic device further comprises a first controller and a specific absorption ratio (SAR) sensor for detecting a human body, wherein the first radiator and the second radiator are connected to each other through the first controller, and the second radiator is connected to the SAR sensor; and in a case that the SAR sensor has detected that a distance between a human body and the electronic device is a first distance, the first controller is adjusted such that a current flowing from the first radiator through the first controller into the second radiator is a first value; and in a case that the SAR sensor has detected that the distance between the human body and the electronic device is a second distance, the first controller is adjusted such that the current flowing from the first radiator through the first controller into the second radiator is a second value, wherein the first distance is greater than the second distance, and the first value is less than the second value.

13. The electronic device according to claim 5, wherein the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

14. The electronic device according to claim 1, wherein the electronic device further comprises a first controller and a specific absorption ratio (SAR) sensor for detecting a human body, wherein the first radiator and the second radiator are connected to each other through the first controller, and the second radiator is connected to the SAR sensor; and in a case that the SAR sensor has detected that a distance between a human body and the electronic device is a first distance, the first controller is adjusted such that a current flowing from the first radiator through the first controller into the second radiator is a first value; and in a case that the SAR sensor has detected that the distance between the human body and the electronic device is a second distance, the first controller is adjusted such that the current flowing from the first radiator through the first controller into the second radiator is a second value, wherein the first distance is greater than the second distance, and the first value is less than the second value.

15. The electronic device according to claim 1, wherein the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

16. The electronic device according to claim 1, wherein the first matching circuit and the second matching circuit each comprises a filter circuit.

17. The electronic device according to claim 1, wherein a distance between the first radiator and the second radiator is 0.5 mm-2 mm.

18. An electronic device, comprising a first feed source, a second feed source, a first matching circuit, a second matching circuit, a first radiator, and a second radiator, wherein the first feed source is electrically connected to the first radiator through the first matching circuit, the second feed source is electrically connected to the second radiator through the second matching circuit, and the first radiator is coupled to the second radiator; and under the action of a first excitation signal input by the first feed source, the first radiator operates in a first band and the second radiator operates in a second band; and under the action of a second excitation signal input by the second feed source, the second radiator operates in a third band and the first radiator operates in a fourth band; wherein the first band, the second band, the third band, and the fourth band are different; and the electronic device further comprises a second controller, and the first radiator and the second radiator are connected through the second controller, and the first matching circuit comprises a first antenna tuner, and/or the second matching circuit comprises a second antenna tuner; wherein in a case that a distance between a human body and the electronic device is a third distance, the second controller is adjusted such that a current flowing from the first radiator through the second controller into the second radiator is a third value, the first antenna tuner adjusts an input impedance of the first radiator to a first impedance, and the second antenna tuner adjusts an input impedance of the second radiator to a second impedance;

in a case that the distance between the human body and the electronic device is a fourth distance, the input impedance of the first radiator is a third impedance, the input impedance of the second radiator is a fourth impedance, the second controller is adjusted such that a current flowing from the first radiator through the second controller into the second radiator is a fourth value, the first antenna tuner adjusts the input impedance of the first radiator from the third impedance to the first impedance, and the second antenna tuner adjusts the input impedance of the second radiator from the fourth impedance to the second impedance; and the third impedance is different from the first impedance, the fourth impedance is different from the second impedance, the third distance is greater than the fourth distance, and the third value is less than the fourth value.

* * * * *